US007286990B1

(12) United States Patent
Edmonds et al.

(10) Patent No.: US 7,286,990 B1
(45) Date of Patent: Oct. 23, 2007

(54) UNIVERSAL INTERFACE FOR VOICE ACTIVATED ACCESS TO MULTIPLE INFORMATION PROVIDERS

(75) Inventors: Paul Edmonds, Palo Alto, CA (US); Yi Zhang, Sunnyvale, CA (US); George Sollman, Atherton, CA (US); Michael P. Tel, Sebastopol, CA (US); Chang Xu, Mountain View, CA (US); Priyen Doshi, San Jose, CA (US); Stephen Co, Foster City, CA (US); David Weinstein, Palo Alto, CA (US); Andy Chan, San Mateo, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/889,911

(22) PCT Filed: Jan. 21, 2000

(86) PCT No.: PCT/US00/01547

§ 371 (c)(1),
(2), (4) Date: Sep. 30, 2003

(87) PCT Pub. No.: WO01/76212

PCT Pub. Date: Oct. 11, 2001

(51) Int. Cl.
*G10L 21/06* (2006.01)
(52) U.S. Cl. .................................................. 704/275
(58) Field of Classification Search ................. 704/275
See application file for complete search history.

(56) References Cited

U.S. PATENT DOCUMENTS

| 4,882,681 | A | * | 11/1989 | Brotz | 704/3 |
| 5,268,839 | A | * | 12/1993 | Kaji | 704/3 |
| 5,297,040 | A | | 3/1994 | Hu | 364/419.08 |
| 5,479,479 | A | * | 12/1995 | Braitberg et al. | 455/404 |
| 5,483,587 | A | * | 1/1996 | Hogan et al. | 379/202 |
| 5,524,137 | A | * | 6/1996 | Rhee | 379/88.01 |
| 5,598,430 | A | * | 1/1997 | Hachisuka et al. | 375/216 |
| 5,603,031 | A | | 2/1997 | White et al. | 395/683 |
| 5,608,786 | A | * | 3/1997 | Gordon | 370/352 |
| 5,633,916 | A | | 5/1997 | Goldhagen et al. | 379/67 |
| 5,647,002 | A | | 7/1997 | Brunson | 380/49 |
| 5,666,400 | A | * | 9/1997 | McAllister et al. | 379/88.01 |
| 5,675,507 | A | * | 10/1997 | Bobo, II | 709/206 |
| 5,689,616 | A | * | 11/1997 | Li | 704/232 |

(Continued)

OTHER PUBLICATIONS

Cole, B., Lotus Hook Organizer to the Web, Network World, Oct. 1996, vol. 13, Iss. 42, p. 14.*

(Continued)

*Primary Examiner*—Susan McFadden
(74) *Attorney, Agent, or Firm*—Townsend and Townsend and Crew LLP

(57) ABSTRACT

An interface for accessing data from one or more information systems using a wireless telephone or other user device. The interface is presented to a user as an abstraction of a unified mailbox and permits access by the user to messaging and other services from the wireless device. The interface is coupled to one or more converting modules to convert user inputs from the format in which they are received into a format that may be input to the desired information system.

18 Claims, 10 Drawing Sheets

U.S. PATENT DOCUMENTS

| | | | |
|---|---|---|---|
| 5,708,804 A * | 1/1998 | Goodwin et al. | 707/3 |
| 5,737,395 A | 4/1998 | Irribarren | |
| 5,790,974 A * | 8/1998 | Tognazzini | 455/456 |
| 5,799,063 A * | 8/1998 | Krane | 379/88.17 |
| 5,822,404 A * | 10/1998 | Cave | 118/70 |
| 5,832,063 A | 11/1998 | Vysotsky et al. | |
| 5,845,282 A * | 12/1998 | Alley et al. | 707/10 |
| 5,859,898 A * | 1/1999 | Checco | 379/88.01 |
| 5,875,422 A * | 2/1999 | Eslambolchi et al. | 704/3 |
| 5,884,262 A * | 3/1999 | Wise et al. | 704/270 |
| 5,915,001 A * | 6/1999 | Uppaluru | 379/88.22 |
| 5,953,393 A * | 9/1999 | Culbreth et al. | 379/88.25 |
| 5,960,113 A * | 9/1999 | Even et al. | 382/229 |
| 5,960,406 A * | 9/1999 | Rasansky et al. | 705/9 |
| 5,991,366 A * | 11/1999 | Henrick et al. | 379/88.18 |
| 5,999,611 A | 12/1999 | Tatchell et al. | 379/211 |
| 6,009,398 A * | 12/1999 | Mueller et al. | 704/275 |
| 6,016,478 A * | 1/2000 | Zhang et al. | 705/9 |
| 6,023,708 A * | 2/2000 | Mendez et al. | 707/203 |
| 6,034,621 A * | 3/2000 | Kaufman | 340/825.44 |
| 6,035,275 A * | 3/2000 | Brode et al. | 704/275 |
| 6,161,082 A | 12/2000 | Goldberg et al. | |
| 6,230,190 B1 | 5/2001 | Edmonds et al. | |
| 6,246,981 B1 | 6/2001 | Papineni et al. | |
| 6,292,772 B1 | 9/2001 | Kantrowitz | |
| 6,304,881 B1 | 10/2001 | Halim et al. | |
| 6,397,345 B1 | 5/2002 | Edmonds | |
| 6,405,033 B1 * | 6/2002 | Kennedy et al. | 455/414.1 |
| 6,412,079 B1 | 6/2002 | Edmonds | |
| 6,598,022 B2 * | 7/2003 | Yuschik | 704/275 |
| 6,728,731 B2 * | 4/2004 | Sarukkai et al. | 707/104.1 |

OTHER PUBLICATIONS

Gonzalez, D. Introducing ICAP as a Calendaring Standard, ENT, Jun. 1998, vol. 3, Iss. 10, p. 60.*

"Enterprise Wildfire," Wildfire, Aug. 11, 1998, 3-pages, downloaded from www.wildfire.com.

"Delivering a Virtual Office for Mobile Professionals," Jan. 7, 1999, 6-pages, downloaded from www.plpt.com.

"Telling your voice mail what you need: Brite to launch speech activated voice mail for wireless," Brite Voice Systems, Jan. 7, 1999, 1-page, downloaded from www.brite.com.

"Persona E-mail Reader," Intellivoice Communications, Inc., 4-pages, downloaded from www.intellivoice.com.

"Universal Messaging Software iPost," Universal Communication Software, product information, 5 pgs.

"AltiGen Open Edition," AltiGen, Apr. 20, 1998, 5-pages, downloaded from www.phonezone.com.

Michelle Quinn, "Calm Amid the Palms," pp. 1C, 5C Mercury News.

"A Simple, Convenient, Reliable Way to Manage your Messages at Home," Pacific Bell Network, 2 pages, Sep. 17, 1998, downloaded from www.pacbell.com.

Jonathan Marshall, "No Resting for This Entrepreneur," pp. D1, D2, San Francisco Chronicle.

"The Power of Unified Messaging," JFAX.COM, 1 page, Sep. 30, 1998, dowloaded from sign.jfax.com.

Peggy Albright, "Mediagate to By Messaging Firm," p. 1, Wireless Week, Dec. 8, 1997.

"Product Overview," General Magic, 2 pages, Jul. 31, 1998, downloaded from www.generalmagic.com.

"Agent Technology," General Magic, 2 pages, Jul. 31, 1998, downloaded from www.generalmagic.com.

"Applications of Agent Technology," General Magic, 3 pages, Jul. 31, 1998, downloaded from www.generalmagic.com.

"Mobile Agents White Paper," General Magic, 22 pages, Jul. 31, 1998, downloaded from www.generalmagic.com.

John G. Spooner, "Puma to Take Synchronization Software to the Server," PC Week Online, Nov. 19, 1997, 1 page, downloaded from www8.zdnet.com.

Miguel Helft, "Sun, Lucent Team up on Unified Messaging," pp. 1C, 2C, San Jose Mercury News, Aug. 18, 1998.

Monica Alleven, "Intellivoice Touts E-mail Reader," Wireless Week, Aug. 11, 1997, 2-pages, downloaded from www.wirelessweek.com.

"Introducing Webley. The First Voice-Activated Assistant Over Your Phone . . . and on the Web," Webley, Aug. 11, 1998, 1-page, downloaded from www.acmi-tel.com.

"What Does Webley Do?," Webley, Aug. 11, 1998, 1-page, downloaded from www.acmi-tel.com.

* cited by examiner

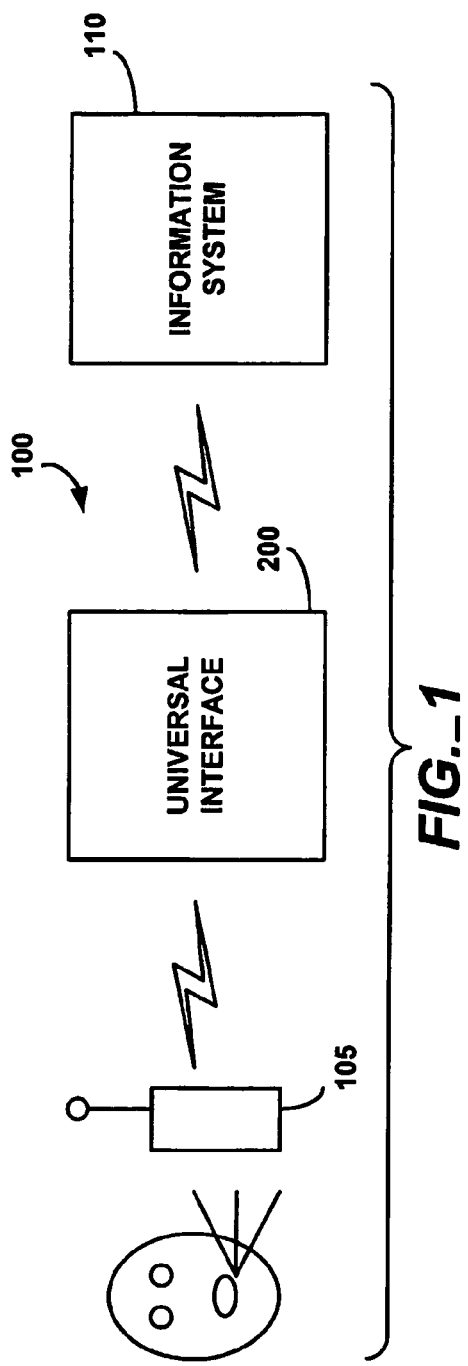
FIG._1
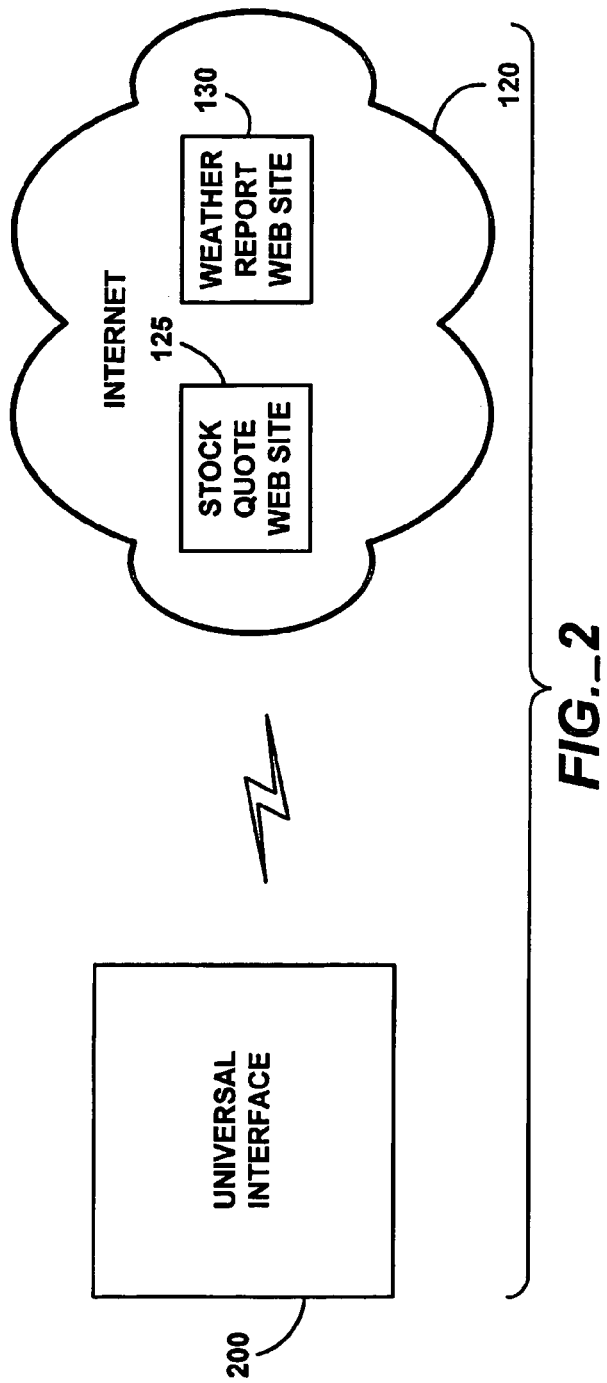
FIG._2

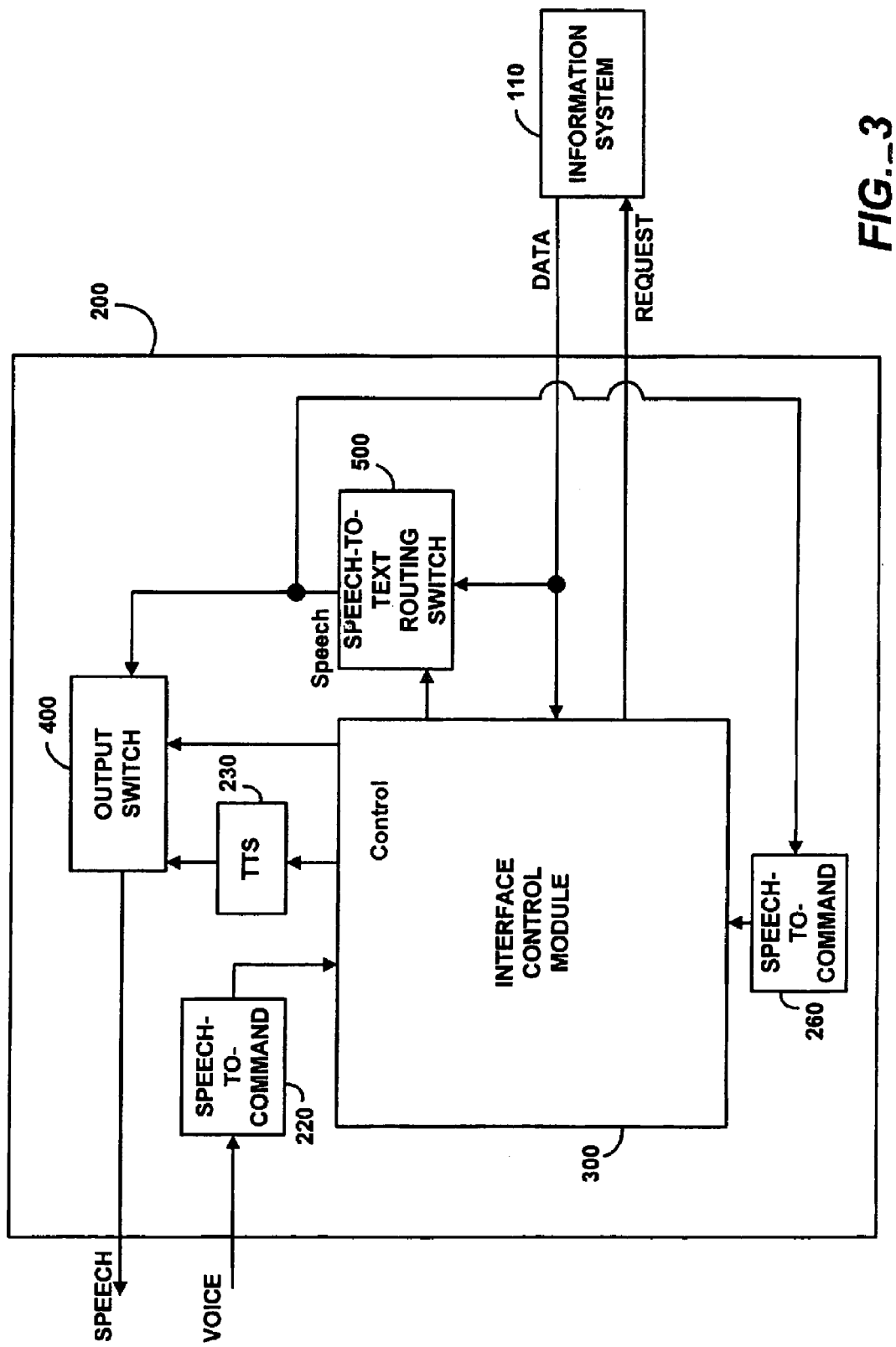
FIG._3

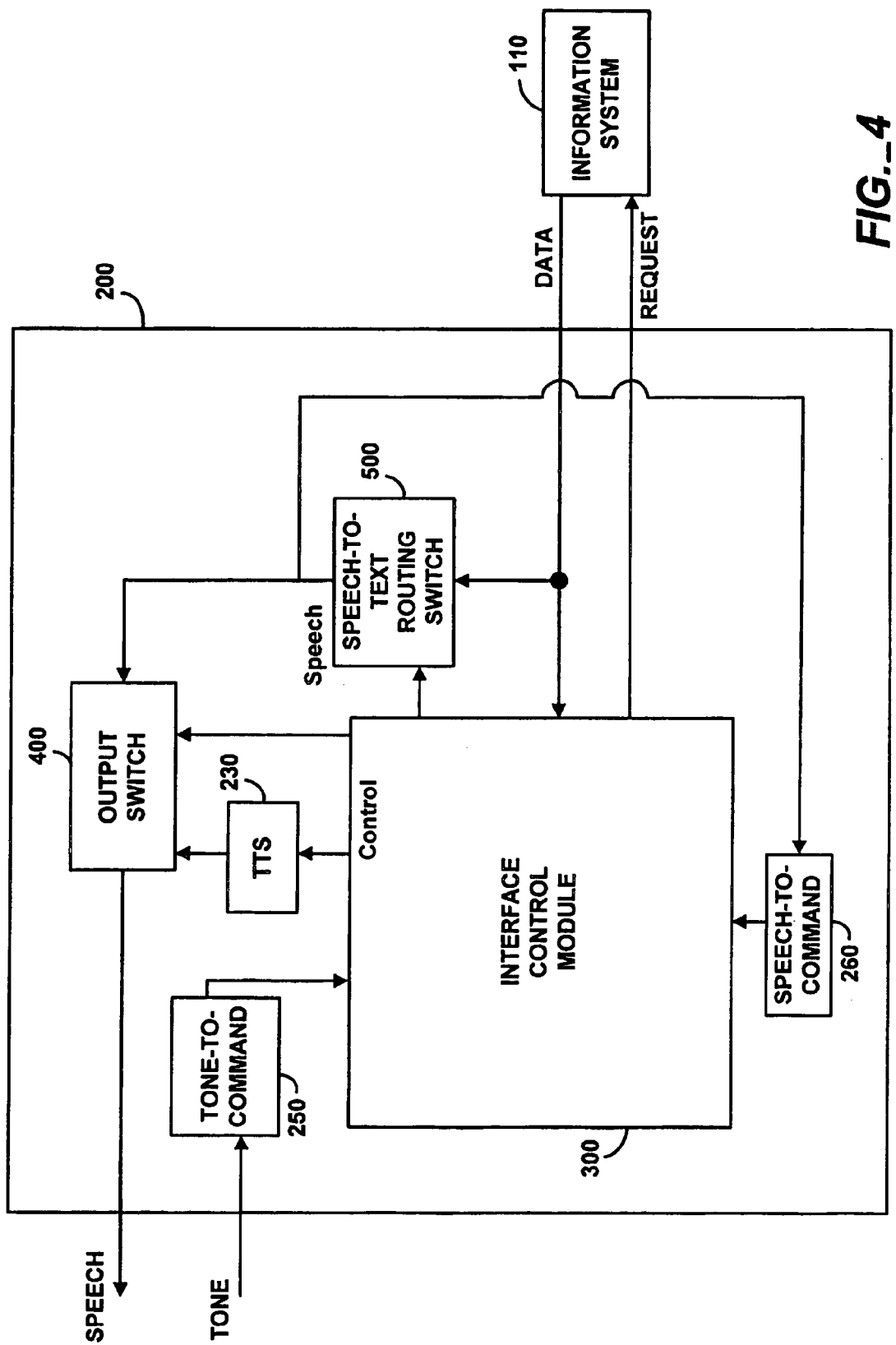
FIG._4

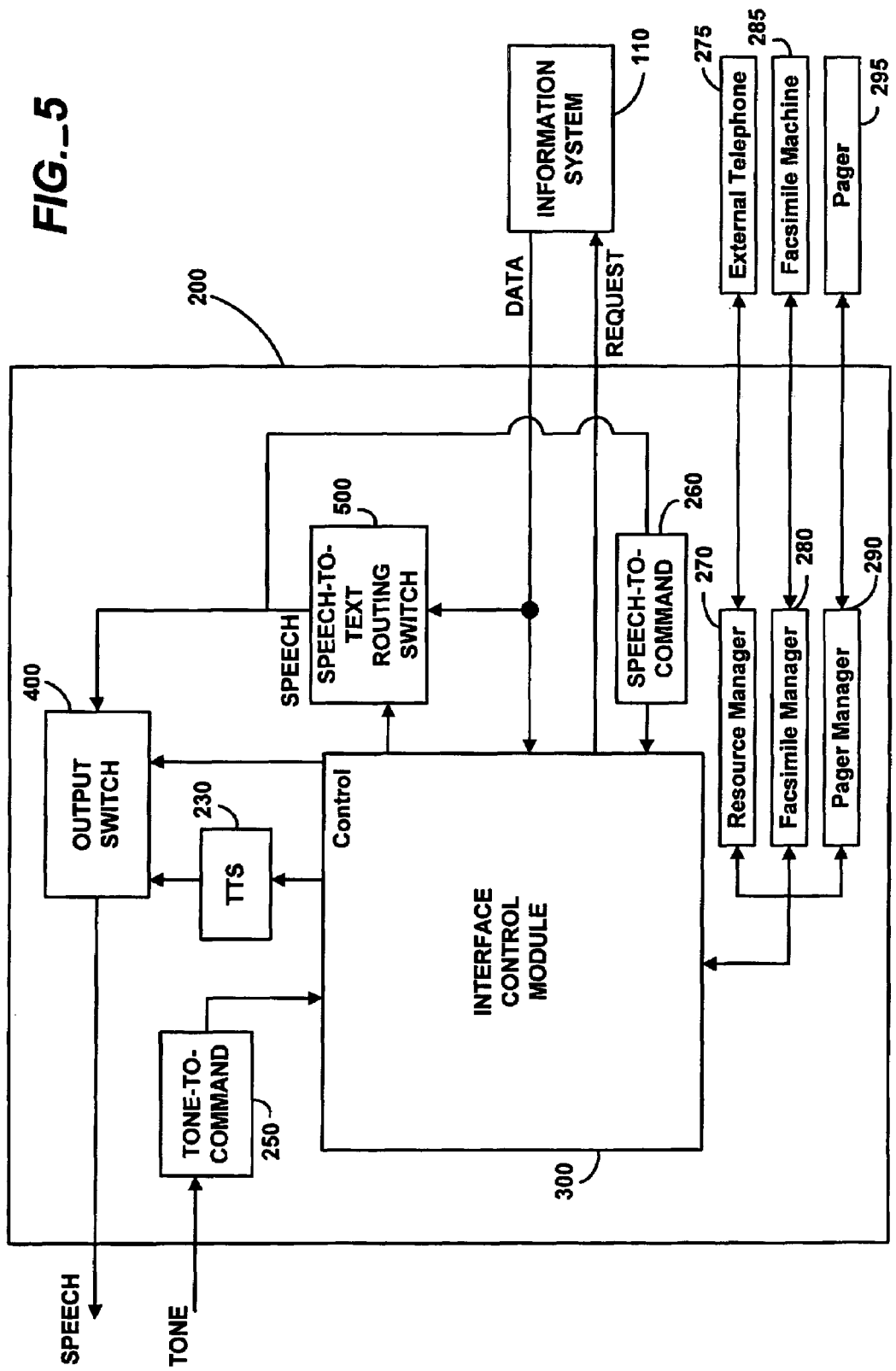
FIG._5

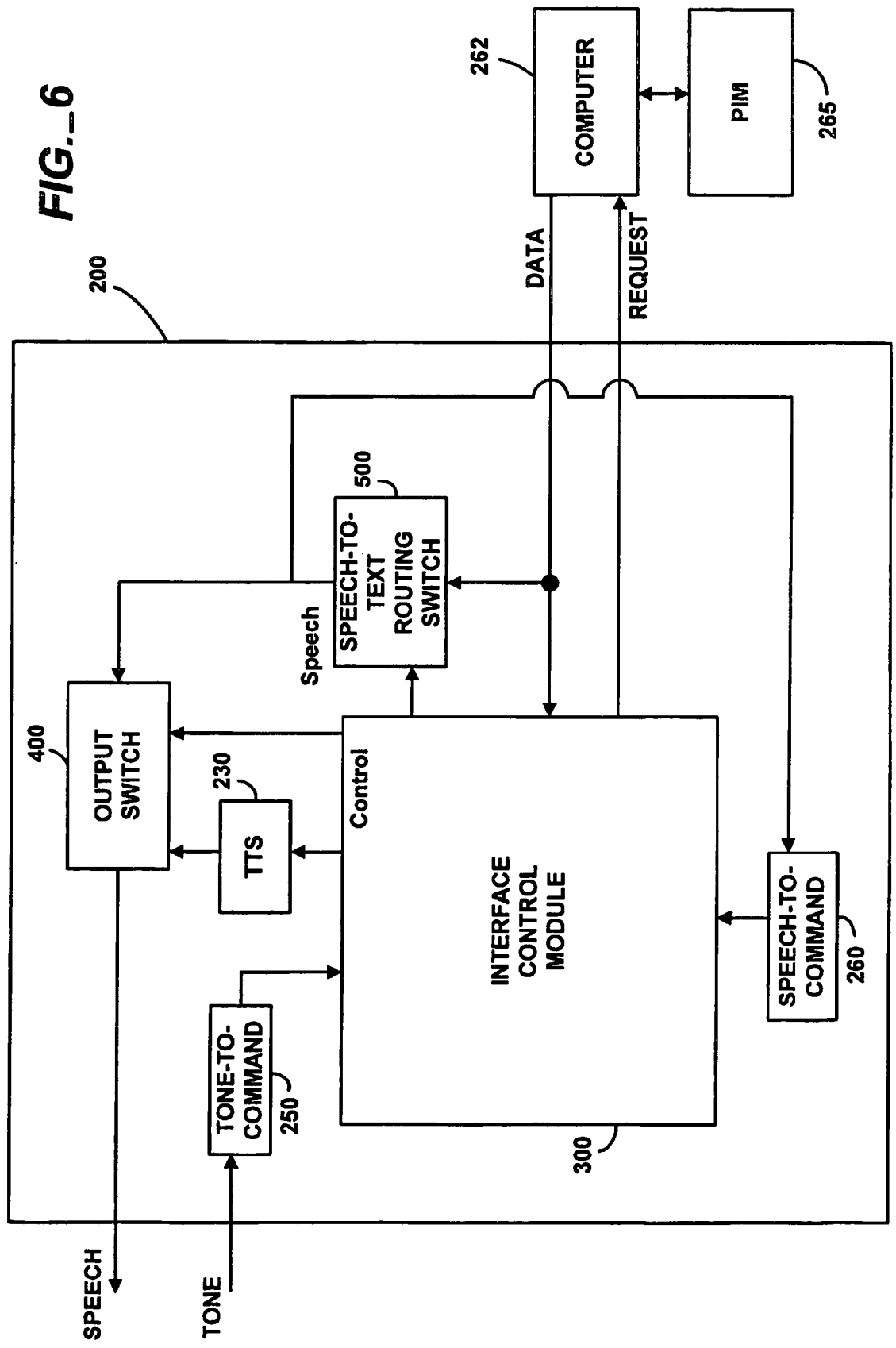
FIG._6

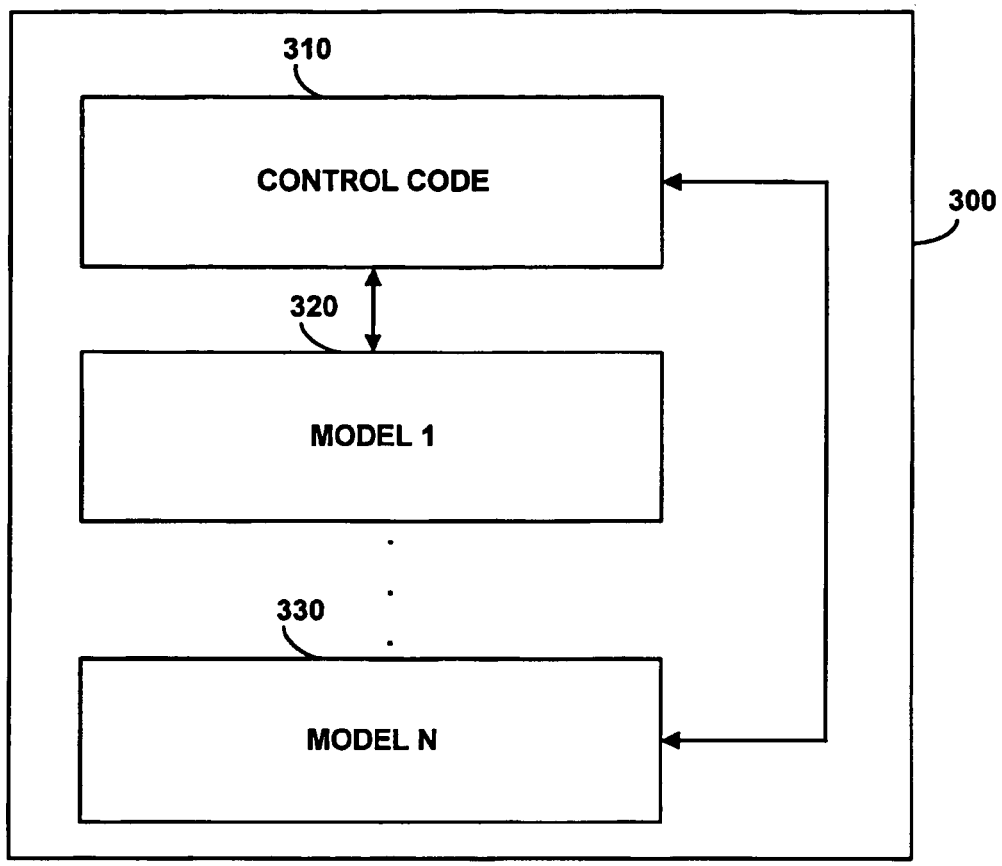
FIG._7
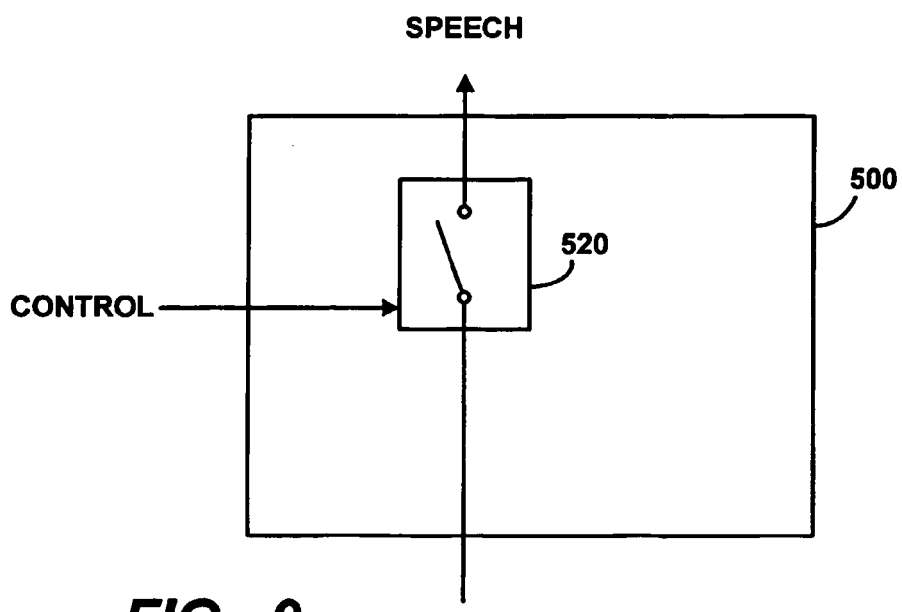
FIG._9

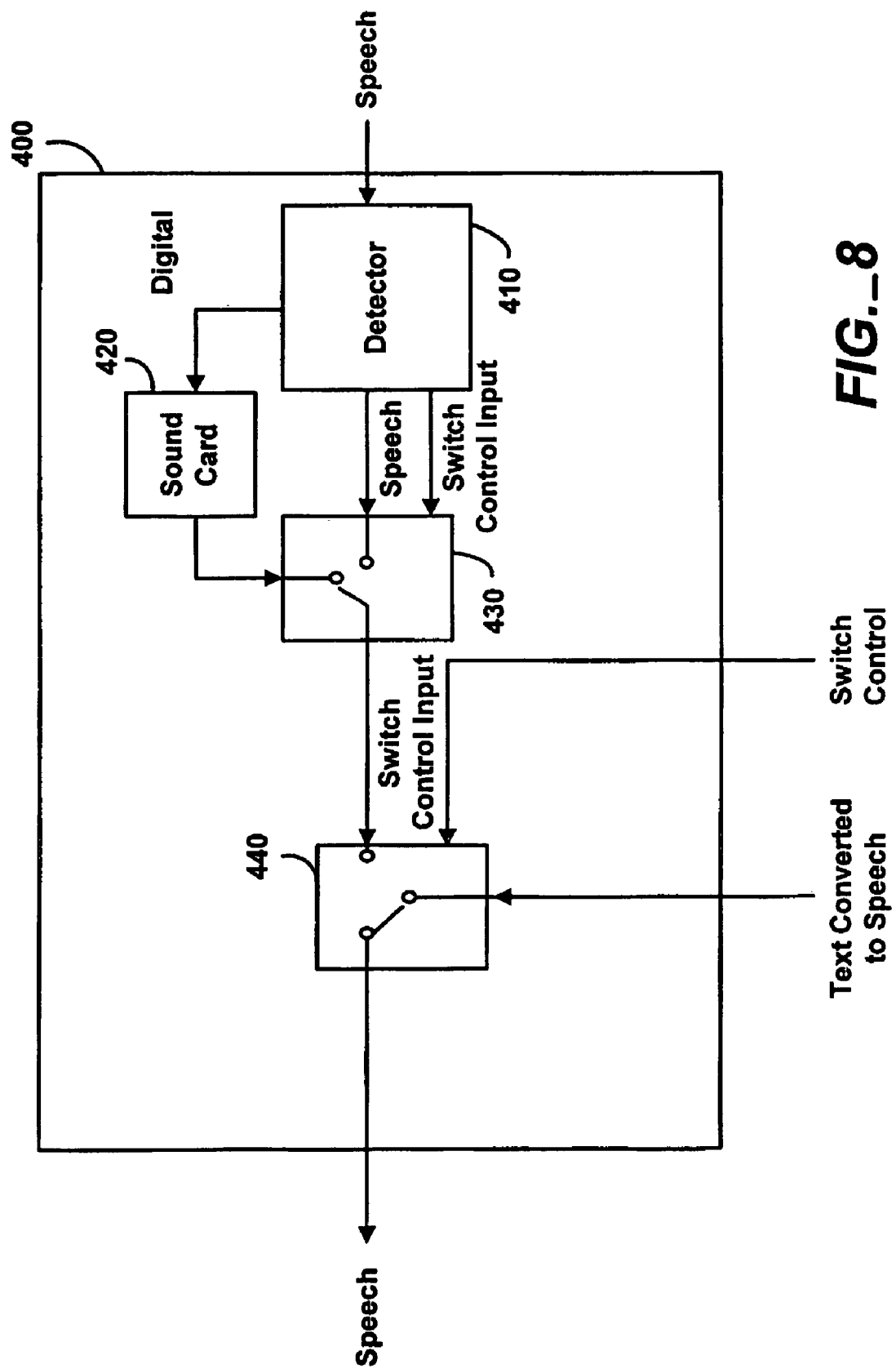
FIG._8

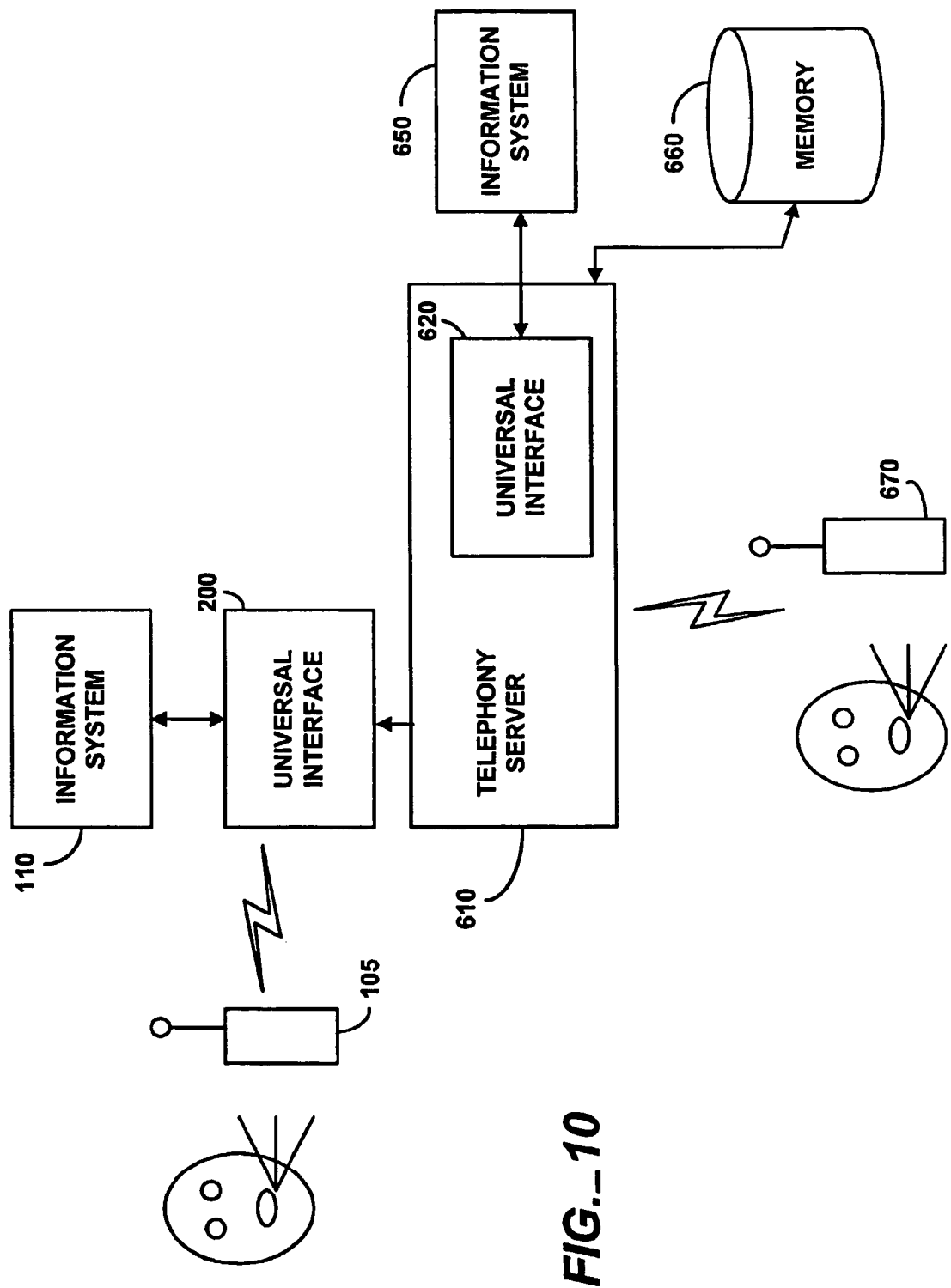
FIG._10

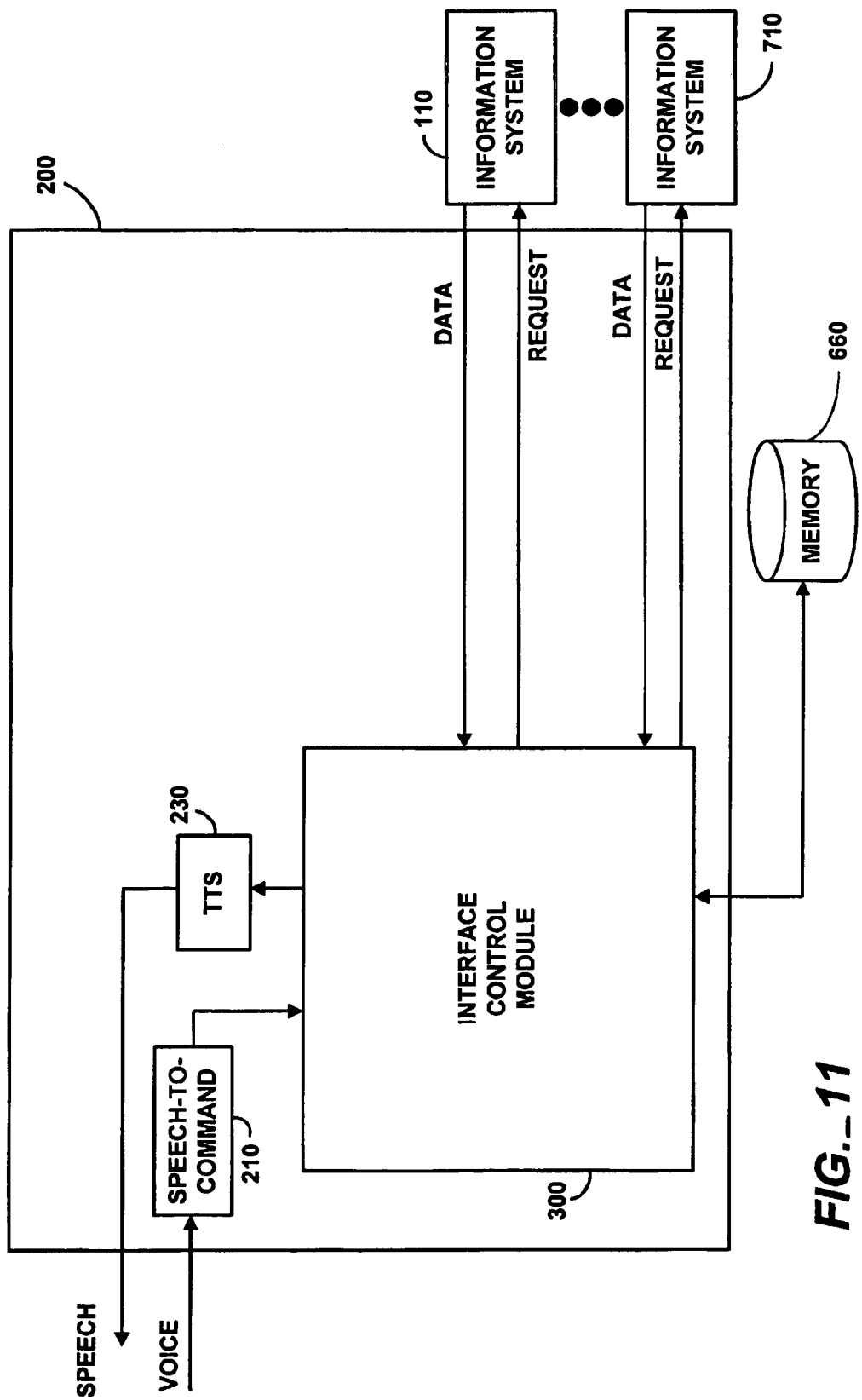
FIG._11

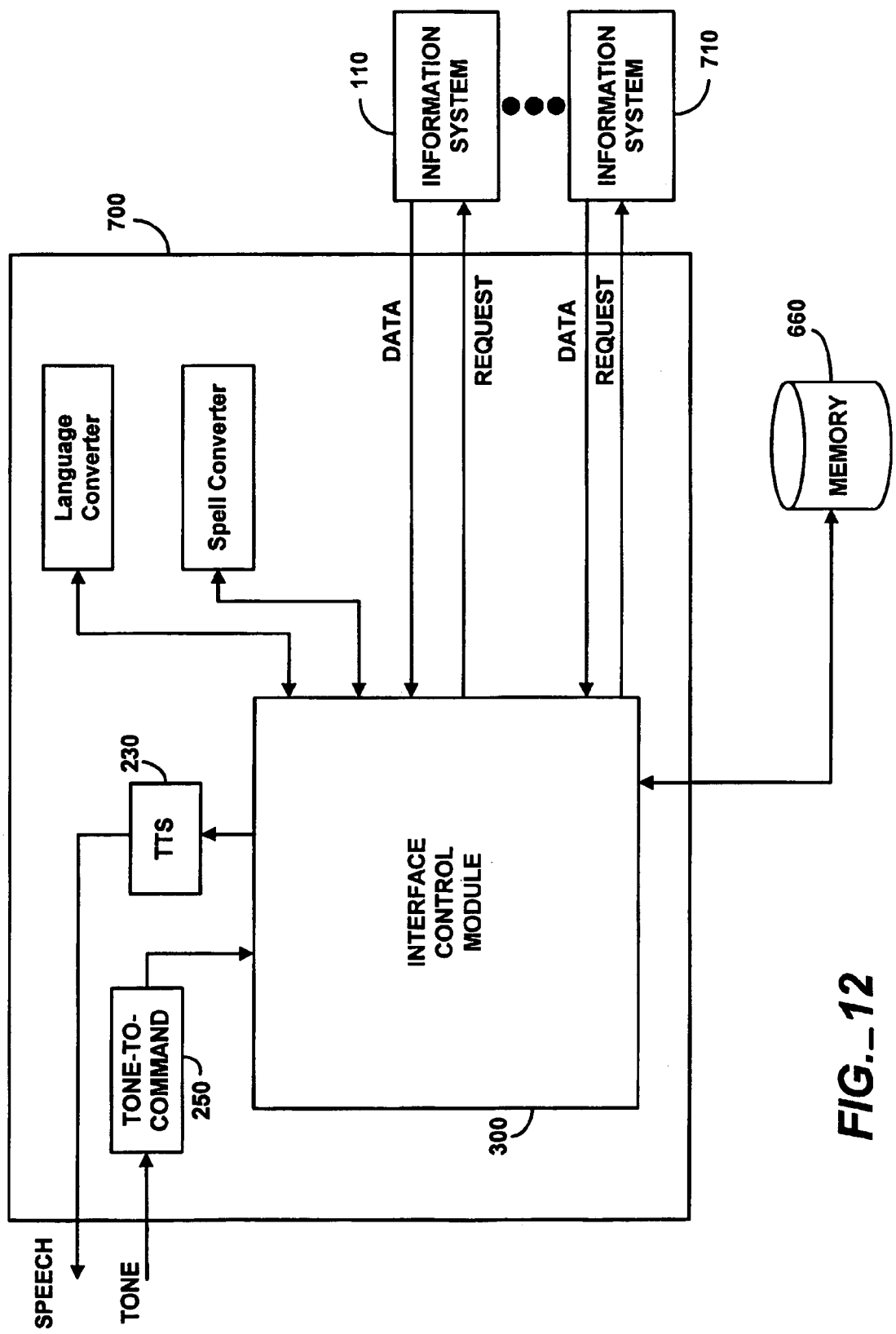
FIG._12

UNIVERSAL INTERFACE FOR VOICE ACTIVATED ACCESS TO MULTIPLE INFORMATION PROVIDERS

BACKGROUND OF THE INVENTION

The present invention relates to an interface for accessing data and, more particularly, to a universal interface for accessing data from one or more information systems using a wireless telephone.

As the content available from information providers expands, so does the complexity of retrieving data. For example, prior to the widespread use of electronic mail (e-mail) and alternate telecommunication systems, individuals would typically leave messages on and retrieve messages from telephone answering machines. With the numerous message centers available today, messages may be scattered over various telephone Messaging systems, electronic mail accounts, and facsimile machines. Moreover, on a daily, if not hourly, basis, individuals are storing information on, and retrieving information from, personal information management systems (PICS), electronic office managers, and world wide web sites.

The availability of these information systems renders information, formerly hard to manage and retrieve, readily accessible. Aiding the accessibility of this data is the fact that much of the data, some of which was previously available only in hardcopy, is now stored electronically and is thus searchable and retrievable. Therefore, individuals are able to access a multitude of data from multiple information providers and from the convenience of their computers.

To date, the advantages associated with the widespread availability of electronic data have not been fully realized. At least three drawbacks exist with respect to the manner in which information currently is stored. First, not all information is stored or available in the same format. For example, some information is stored as speech, others are stored as text. Second, some information is available only in text form, and would thus be inaccessible to a traveler or a mobile user who needs to access information using his or her wireless phone. Third, even the if information is available in the same format and accessible to wireless telephones, the information is not centralized, but is generally offered by a number of information providers. Thus, if one sought access to various data, he or she would need to access numerous information systems.

SUMMARY OF THE INVENTION

A universal interface accesses one or more information systems from a telephone, each of the information systems being adapted to generate text data or speech data in response to a query. The universal interface includes an interface control module for receiving a sound-based command from a user and for sending a corresponding machine readable command to a source selected from one of the information systems, the interface control module receiving data from the source in response to the corresponding machine readable command; a text-to-speech converter coupled to the interface module for converting text data received by the interface control module to a converted speech segment and playing the converted speech segment for the user; and a router coupled to the interface module for receiving speech data from the source and playing a speech segment corresponding to the speech data for the user.

Implementations of the system may include one or more of the following. The telephone can be wireless. The sound-based command can come from the user's voice, or can be specified using one or more telephone touch-tones.

In another aspect, a universal interface accesses one or more information systems from a user telephone. The universal interface includes an input converter for converting input from the user telephone to commands; an interface control module coupled to the input converter for receiving the commands from the input converter; determining one of the information systems to be accessed; converting the commands to commands recognizable by the information system; forwarding the converted commands to the information system; receiving data from the information system; detecting the form of the data from the information system; and storing information relating to a current state of the system. The universal interface also includes a speech-to-text routing switch coupled to the interface control module for receiving data from the information system and control data from the interface control module; a speech-to-command converter coupled to the interface control module for converting speech to commands, wherein the speech-to-command converter coupled to the speech-to-command routing switch to receive speech and to forward commands to the interface control module; an output switch coupled to the interface control module and the speech-to-text routing switch for receiving speech from the speech-to-text routing switch for receiving a control input from the interface control module, and for forwarding speech from the speech-to-text routing switch to the user telephone; and a text-to-speech converter coupled to the output switch for receiving text from the interface control module, converting the text to speech, and forwarding the speech to the output switch to deliver speech to the user telephone. The user telephone is a mobile telephone. The input converter can be a speech-to-command converter, a tone-to-command converter. The interface control module integrates the data from the information system periodically or manually under user control and includes: means for retrieving data from the information systems; means for determining antecedent comparable relevance of the data; means for updating all of the data to reflect the most recent data; means for linking relevant data; and means for exporting the linked data to the information system.

Implementation of the above aspect may include one or more of the following. The information systems can include two or more of the following: a calendar; a to-do list; an address book; voice mail; e-mail; and a web site. The interface control module integrates and synchronizes (i) a database of a personal information manager, (ii) a database residing on a personal digital assistant, and (iii) a database residing in the universal interface, the universal interface coupled to a computer on which the personal information database resides. A computer further comprises: a first input terminal for receiving data from the personal digital assistant; a second input terminal for receiving data from the universal interface; a sensor for detecting a synchronization event triggered by a user requesting synchronization of the database of the personal digital assistant with the database of the personal information manager; an electronic mail system coupled to the Internet; and control logic coupled to receive the synchronized event from the sensor and to transmit data, over the electronic mail system, to the interface control module, wherein the control logic updates the data in each of the databases to reflect the most recent data entered into any database. The synchronization information can be sent to the universal interface in its entirety, in compressed form, or in incremental form. The data sent from the information system to the universal interface can be sent over the Internet. The data sent can be encrypted. The output switch can be a detector for determining whether the speech from the speech-to-text routing switch is digital or analog; a sound card coupled to the detector to receive digital data; a first speech routing switch for receiving a control input from the detector, and speech from the detector or speech from the sound card; a second speech routing switch for receiving the control input from the interface control module and speech from the first speech routing switch or speech from the text-to-speech converter, the second speech routing switch forwarding speech to the user telephone. The information system can include at least one of: a dual tone multiple frequency (DTMF) driven voice mail system, a voice driven voice mail system, an electronic mail system, a web site, and a personal information manager. The system can determine one of the following: whether the voice commands are being received from a user telephone; the information system to be accessed; whether the voice commands, after being converted to commands, are recognizable to the information system; whether the converted commands have been forwarded to the information system; whether data has been received from the information system; whether data from the information system is speech or text; the state of the speech-to-text routing switch; and the state of the output switch.

The interface control module further includes a model for converting commands from the telephone into commands recognizable by the information system; and a translator coupled to the input converter for retrieving the model corresponding to the information system to be accessed and for converting the commands to commands recognizable by the information system. The universal interface can include means coupled to the input converter for signaling that the user telephone has received unintelligible words; means for restarting communication to the text-to-speech converter at a point a specified number of words back from the point at which the communication ceased; means for forwarding the first specified number of words by spelling the words out; and means for continuing forwarding the data after the specific number of words. The universal interface can include means for detecting a first language in which the commands from the user telephone are received; means for detecting a second language associated with the data received from the information system; and means for converting the data from the information system into the first language. The system can detect more than one languages within a single fragment of data. A resource manager for establishing conference bridges to an external telephone having a telephone number, wherein the interface control module detects, from the commands from the input converter, whether a conference bridge request has been made; the interface control module retrieves the telephone number of the external telephone to establish the conference bridge; the interface control module forwards the telephone number to the resource manager; and the resource manager establishes a telephone connection with the external telephone. A facsimile manager can be used for sending facsimiles to one or more facsimile machines, wherein: the interface control module detects, from the commands from the input converter, whether a facsimile request has been made; the interface control module retrieves a telephone number of a designated facsimile machine; the interface control module forwards the data and the telephone number to the facsimile manager; and the facsimile manager faxes the data to the designated facsimile machine.

The universal interface can have a pager manager for sending pager messages to one or more pagers, wherein the interface control module detects, from the commands from the input converter, whether a pager request has been made; the interface control module retrieves data to be forwarded to the pager; the interface control module retrieves a telephone number of a designated pager to which the data is to be forwarded; the interface control module forwards the data and the telephone number to the pager manager; and the pager manager forwards the data to the designated pager.

In another aspect, a universal interface for accessing data from one or more information systems includes an input converter for receiving inputs from the user telephone and converting the inputs into commands; and an interface control module coupled to the input converter. The interface control module includes means for periodically requesting data from the information systems; means for retrieving data from the information system; means for detecting the form of data from the information system; means for converting the data that is speech to commands; means for storing the data for later access by a user telephone; and means for storing information representing a current state of the system; and further including means for receiving commands from the input converter and means for detecting which of said stored information is sought to be accessed;

a text-to-speech converter coupled to the interface control module for receiving said requested stored text from the interface control module, converting the text to speech, and forwarding the speech to the user telephone.

The input converter can be a speech-to-command converter or a tone-to-command converter. The interface control module integrates the data from the information system periodically or manually under user control, and can include means for retrieving data from the information systems; means for determining antecedent comparable relevance of the data; means for updating all of the data to reflect the most recent data; means for linking relevant data; and means for exporting the linked data to the information system.

The interface control module integrates and synchronizes (i) a database of a personal information manager, (ii) a database of a personal digital assistant, and (iii) a database residing in the universal interface, the universal interface coupled to a computer on which the personal information database resides. The computer can include a first input terminal for receiving data from the personal digital assistant; a second input terminal for receiving data from the universal interface; a sensor for detecting a synchronization event, wherein the event is triggered by a user requesting synchronization of the database of the personal digital assistant with the database of a personal information manager; an electronic mail system coupled to the Internet; control logic coupled to receive detection information from the sensor and to transmit data, via the electronic mail system, to the interface control module, wherein the control logic updates the data in each of the databases to reflect the most recent data entered into any one database. The synchronization information is sent to the universal interface in its entirety, in compressed form, or in incremental form. The data sent from the information system to the universal interface is sent over the Internet. The data sent over the Internet is encrypted. The information system can be a dual tone multiple frequency (DTMF) driven voice mail system, a voice driven voice mail system, an electronic mail system, a web site, and a personal information manager. The system can determine whether the voice commands are being received from a user telephone; the information system to be accessed; whether the voice commands, after being converted to commands, are recognizable to the information system; whether the converted commands have been forwarded to the information system; whether data has been received from the information system; whether data from the information system is speech or text; the state of the speech-to-text routing switch; and the state of the output switch. The interface control module includes one or more models containing commands recognizable by the information system; control logic for accessing the model that corresponds with the information system to be accessed, converting control commands to commands recognizable by the information system, and forwarding the converted commands to the information system. The universal interface includes means coupled to the input converter for signaling that the user telephone has received unintelligible words; means for restarting communication to the text-to-speech converter at a point a specified number of words back from the point at which the communication ceased; means for forwarding the first specified number of words by spelling the words out; and means for continuing forwarding the data after the specific number of words. The universal interface can include means for detecting a first language in which the commands from the user telephone are received; means for detecting a second language associated with the data received from the information system; and means for converting the data from the information system into the first language. The universal interface further includes means for detecting more than one language within a single fragment of data.

In another aspect, a method provides data from one or more information systems to a user telephone by converting speech from the user telephone to commands; determining the information system to be accessed; converting the text to commands recognizable by the information system; forwarding the converted commands to the information system; receiving data from the information system; detecting the form of the data from the information system; converting non-speech data from the information system into speech; forwarding the speech data to the user telephone; and storing information relating to the current state of the system.

Implementations may include one or more of the following. The converting speech from the user telephone can include converting speech from a mobile telephone, converting speech to commands, or converting dual-tone-multiple-frequency (DTMF) information to commands. The data can be synchronized from the information systems by periodically, or upon command: retrieving data from the information systems; comparing the data to determine which data is most recent; updating all of the data to reflect the most recent data; linking relevant data; and exporting the linked data to the information systems.

The information systems can include two or more of the following: a calendar; a to-do list; an address book; voice mail; e-mail; and a web site. The method includes integrating and synchronizing (i) a database of a personal information manager, (ii) a database of a personal digital assistant, and (iii) a database residing in a universal interface, by: receiving data from the personal digital assistant; receiving data from the universal interface; detecting a synchronization event, wherein the event is triggered by a request for synchronization of the database of the personal digital assistant with the database of a personal information manager; transmitting data, via an electronic mail system, to the interface control module; and updating the data in each of the databases to reflect the most recent data entered into any one database. The synchronization information can be sent to the universal interface either in its entirety, in compressed form, or in incremental form. The data can be sent from the information system to the universal interface over the Internet. The method includes encrypting the data from the information system before sending the encrypted data over the Internet. The information system can include at least one of: a voice mail system, and an electronic mail system, a web site, and a personal information manager. The method includes storing information relating to the current state of the system further including determining whether the voice commands are being received from a user telephone; the information system to be accessed; whether the voice commands, after being converted to commands, have been converted into commands recognizable by the information system; whether the converted commands have been forwarded to the information system; whether data has been received from the information system; whether data from the information system is speech or text; the state of the speech-to-text routing switch; and the state of the output switch.

The converting of text to commands recognizable by the information system can include accessing one or more models for converting commands from the telephone into commands recognizable by the information system. The method also includes receiving a command from the user telephone signaling that the user telephone has received unintelligible words; ceasing communication to the user telephone; restarting communication to the user telephone at a point a specified number of words back from the point at which the communication ceased; forwarding the first specified number of words by spelling the words out; and continuing to forward the remainder of the data. The method can also include detecting the language in which the commands from the user telephone are received; detecting the language of the data received from the information system; converting the data from the information system into the language in which commands from the user telephone are received.

The detecting the language of the data received from the information system further includes detecting more than one language within a single piece of data. The method includes establishing conference bridges to one or more external telephones, by: detecting, from the commands from the input converter, whether a conference bridge request has been made; retrieving a telephone number of the external telephone to which the conference bridge is to be established; forwarding the telephone number to a resource manager; and establishing, through the resource manager, a telephone connection with the external telephone, thereby opening a line of communication between the user telephone and the external telephone. The method includes sending facsimiles to one or more facsimile machines, by: detecting, from the commands from the input converter, whether a facsimile request has been made; retrieving data to be faxed; retrieving a telephone number of a designated facsimile machine to which the data is to be forwarded; forwarding the data and the telephone number to a facsimile manager; and with the aid of the facsimile manager, faxing the data to the designated facsimile machine. The method also includes sending pager messages to one or more pagers, by: detecting, from the commands from the input converter, whether a pager request has been made; retrieving data to be forwarded to a pager; retrieving a telephone number of a designated pager to which the data is to be forwarded; forwarding the data and the telephone number to a pager manager; and with the aid of the pager manager, forwarding the data to the designated pager.

In another aspect, a method accesses data from one or more information systems by retrieving data from the information system; detecting the form of data from the information system; converting the data that is speech to text;

storing the data for later retrieval; and storing information representing the current state of the system.

Advantages of the invention include one or more of the following. The invention provides a seamless access to one or more information systems. More particularly, the invention provides access to multiple communication systems, some of which are text-driven, using a wireless telephone. The Universal Interface ("UI") of the invention recognizes voice commands, converts the commands into commands recognizable by the information systems, and utilizes the converted commands to access information systems and retrieve data therefrom. The UI enables an individual to retrieve all of his or her information using a single device such as a wireless telephone. For instance, the individual can retrieve various information from a wireless telephone including voicemail messages, personal information manager information, to do lists, electronic mail messages, and information stored on the Internet.

The UI presents the user with an abstraction of a unified mailbox (fax, e-mail, voice mail, among others) and advanced web services from a wireless telephone. It does not lock the individual into one information provider, and allows the user to access multiple information providers with a single telephone call. It also provides a simple system that acts as a conduit, translating an individual's spoken or tone commands into commands recognizable by the various information systems.

BRIEF DESCRIPTION OF THE DRAWINGS

FIG. 1 is a block diagram illustrating a universal interface for a mobile user.

FIG. 2 is a block diagram showing the universal interface for accessing the Internet.

FIG. 3 is a block diagram illustrating a first embodiment of the universal interface for processing speech commands.

FIG. 4 is a block diagram illustrating a second embodiment of the universal interface for processing touch-tone input.

FIG. 5 is a block diagram illustrating a third embodiment of the universal interface, with resource, facsimile, and pager managers.

FIG. 6 is a block diagram showing the universal interface of FIG. 3 for communicating with a personal information manager ("PIM").

FIG. 7 is a block diagram illustrating an interface control module.

FIG. 8 is a block diagram illustrating an output switch of the universal interface.

FIG. 9 is a block diagram illustrating a speech-to-text routing switch of the universal interface.

FIG. 10 is a block diagram illustrating various ways of accessing the information systems using the universal interface.

FIG. 11 is a block diagram illustrating automatic data retrieval and non-real-time access to the universal interface using voice commands.

FIG. 12 is a block diagram illustrating automatic data retrieval and non-real-time access to the universal interface using touch-tone inputs. FIG. 12 includes language converter and spell converter options.

DESCRIPTION

Referring now to FIG. 1, a universal interface 200 for mobile users is shown. A user communicates with an information system 110 using a telephone 105 which may be wireless. A universal interface 200 receives user commands from the wireless telephone 105 and converts those commands into commands recognizable by the information system 110. The universal interface 200 then sends those commands to the information system 110. The information system 110 responds to the user commands and sends the responsive information to the universal interface 200. The universal interface 200 converts the data from the information system 110 if the data is not in a format recognizable by the wireless telephone 105. Finally, the universal interface 200 provides the data to the mobile telephone 105, thus providing the data to the user. This process of retrieving information from the information system 110 through the universal interface 200 is repeated until the user retrieves all the required data.

The universal interface 200 can be used to access various data in addition to voice mails and e-mail. For example, as shown in FIG. 2, the user can access Internet data such as stock quotes and weather reports from web sites 125 and 130 on the Internet 120. These data are collected and processed by a web server using intelligent web server agent tools such as the webMethods B2B, eXtensible Markup Language (XML)-based e-commerce solution, available from webMethods, Inc. of Fairfax, Va.

WebMethods B2B automates data exchange between different applications, Web sites and legacy data sources. WebMethods B2B employs Web Interface Definition Language (WIDL), which enables the characterization of automated accesses to Web-enabled resources and other applications through well-defined interfaces. By abstracting such information, the applications can continue to be accessed regardless of changes in the location, appearance, and structure of the underlying data.

Alternatively, data may be collected and processed by a web server using VoxML Voice Mark-up Language, available from Motorola, Inc. VoxML is a mark-up language designed specifically for voice applications on the Web. It is based on the W3C XML standard and follows the syntactic rules of XML. Further, VoxML offers the advantage of allowing for the querying of web servers through the use of voice commands sent over a telephone. The VoxML language can be used to express multi-step dialogues that collect commands, input values, and audio samples from a user, and play recorded audio and synthesized speech back to the user.

In one embodiment, to communicate with the user, the UI 200 is connected to a cellular switch over one or more T1 lines. This connection allows a mobile telephone user to dial into the cellular switch, and concomitantly into the UI 200. The UI 200 uses the D240 T1 platform, available from Dialogic Corp. of Parsippany, N.J. Connectivity to the cellular switch can be via SS7 or E&M MF/DTMF Channel Associated Switching, where the UI 200 can talk to the switch using SS7 point codes. Ports can be universal, so that they can function either as incoming or outgoing ports using dynamic reallocations. The universal interface 200 may operate on a scalable and fault-tolerant computer system such as that disclosed in copending U.S. application Ser. No. 09/169,838, entitled "Server Pool for Clustered System," filed Oct. 9, 1998 and commonly assigned, hereby incorporated by reference; and as that disclosed in copending U.S. application Ser. No. 09/169,361, entitled "Fault Tolerant Bus for Clustered System," filed Oct. 9, 1998, and commonly assigned, hereby incorporated by reference.

FIG. 3 illustrates the internal structure of the universal interface. If the input to the universal interface 200 is voice, the voice is first converted to computer-recognizable commands via a speech-to-command converter 220. The converter 220 uses the Speech Recognition Technology software, available from Nuance Communications of Menlo Park, Calif. The implementation can either be host-based or line card-based.

Once the speech has been converted to computer-recognizable commands, the converted commands are then provided to an interface control module ("ICM") 300. The interface control module 300 receives commands from the speech-to-command converter 220 and determines which information system the user is attempting to access. It then converts the commands into commands recognizable by the information system 110. The interface control module 300 then establishes contact with the information system 110. Once contact has been established, the interface control module sends converted commands to the information system. These converted commands are processed by the information system in the same manner as if the user was accessing the information system directly. The information system 110 receives the commands and provides data in response. The data generated by the information system 110 is provided to both the interface control module 300 and a speech-to-text routing switch 500. The interface control module 300 determines whether the data from the information system 110 is speech or text. The interface control module 300 then sends a control signal to the speech-to-text routing switch 500. This control signal indicates whether the speech-to-text routing switch 500 should be toggled.

In a toggled state, the data from the information system 110 is sent directly through the speech-to-text routing switch 500 into an output switch 400. The speech-to-text routing switch 500 is only toggled, and thus only sends data directly to output switch 400, when the interface control module 300 detects that the data from the information system 110 is speech. The data sent directly to output switch 400 is also sent to speech-to-command converter 260. The speech-to-command converter 260 converts the speech into commands and sends the commands to the interface control module 300. The ICM 300 uses these commands to determine the state of the system.

If, on the other hand, the interface control module 300 detects that the data from the information system 110 is text, the interface control module will route the text to the text-to-speech converter 230, and will send a control signal to output switch 400, routing the speech, from the text-to-speech converter 230 to the output of the universal interface 200.

The text-to-speech converter 230 automatically produces speech through transcription. The text-to-speech converter contains two modules—one that processes natural language and a second that performs digital signal processing. The first module converts text into its phonetic equivalent. The second converts the output of the first into speech. In the alternative, a conventional voice response system can be employed.

Also, in the embodiment the text-to-speech engine may operate on a D240 T1 line card (which is available from Dialogic). Also, Accuvoice's or Lernout & Hauspie's TruSpeech software can be used to handle speech.

Also, in one embodiment, a VUI (Voice User Interface) indicates various phrases that the system will recognize, and a VAV (Virtual Assistant Voice) indicates prompts and information from voice messages, PIM or the Web that the system will play. The VUI allows the user to speak naturally to request the information the user needs at any level. However, when the user wants to enter information to the speaker, the user initiates a step-by-step process to interact with the system.

For example, a user's first command may take the form of:

"I would like to access my [menu item]," where menu item might be calendar, to do list, address book, auto wakeup, web information, or another information system, where words not between brackets are optional.

Once the user has accessed one of the menu items, typical user commands might include:

Play mail: "[Play,Brief] [priority] [E-mail, voice mail] from [person]," where priority can be urgent or normal, among others.

Address book look-up: "I would like to [Find, lookup] [name]," where name is the person's name the user wants to find.

Call management: "[I would like to] [call, dial, make a conference call to] [Name, phone number]," where name is the person's name the user wants to call.

Appointment and to do list lookup: "I would like to [find, check] My [appointment, to do] for [date]," where date can be tomorrow or any day of the week.

When the user utters these commands to the system, the system looks for information to complete the commands. If the system cannot complete the commands, the UI 200 prompts the user step-by-step for the required information. For example if the system registers the appointment keyword, but not the date, the UI 200 prompts the user for only the date. The UI 200 might state, "Which appointment date do you want me to check?"

Just as the UI 200 allows the user to access information, it operates similarly to allow the user to communicate information. In one embodiment, the UI 200 has a second level menu structure. This second level structure, in response to the user's commands, prompts the user for information. For example, the initial user command might be: "I would like to [make, delete, update] [an entry, an item, a name]." If the user chooses to update an address entry, the UI 200 may prompt the user as follows:

"What is the business phone number of the person?"
[user speaks business phone number]
"What is the home phone number of the person?"
[user speaks home phone number]

In one embodiment, the UI 200 can repeat the user information to ensure that the information has been entered correctly. In another, the user can query the number of entries in the address book.

The user can also enter entries to an appointment calendar. In this instance, the UI 200 may prompt the user for a date of the appointment, a beginning time of the appointment, a duration of the appointment, and an agenda.

The user can also provide entries to the to-do list. The UI 200 might then provide prompts for the due date, priority, and agenda. If the user prompts the UI 200 to enter an autowakeup, the UI 200 may prompt the user for the date of the entry and the time of the entry, and the phone number to dial at the wake-up time.

If the user prompts the UI 200 to set up a conference call, the UI 200 may prompt the user as follows: "Who do you want to conference in? Say the name of the persons or phone number. When you are finished say 'done.'" After each time the user speaks a name or number, the UI 200 responds with "Got it. Who is next?" The UI 200 continues to prompt the user until the user indicates that he or she is done entering names or numbers.

In another embodiment, if an incoming call occurs during the conference call, the UI 200 indicates to the user that there is an incoming call. For example, the UI 200 may say "[Name] is on the other line, do you want to take it?" The user may then answer: "[I will take it, conference her in, voice mail, (ignore virtual assistant)]."

Just as the user can update information, he or she can also delete or modify entries. If the user attempts to delete information, the UI 200 may prompt the user to verify the request prior to deleting the entry. And, just as in conventional systems, certain use preferences such as whether or not to inquire before deleting may be stored in memory.

Further, once the user has prompted the UI 200 to perform a particular function, the UI 200 can prompt the user to ensure that the user does not want to repeat a similar function. For example, once the user has prompted the UI 200 to enter an item into the to-do list, the UI 200 might prompt the user to determine if the user wants to add another entry.

In one embodiment, the UI 200 has additional functions related to the playing or briefing of messages. These commands include: save, delete, play, forward, reply, next, previous, higher volume, lower volume, skip forward, skip backward, faster, slower.

In FIG. 3, the text-to-speech converter 230 routes speech to the output switch 400. The interface control module 300 sends a control signal to the output switch 400. In a non-toggled state, the output switch 400 receives the output of the text-to-speech converter 230. In a toggled state, the output of the output switch 400 receives the output of the speech-to-text routing switch 500.

If the data from the information system 110 is speech, it is routed directly to the output of the universal interface 200. If, on the other hand, the data from the information system 110 is text, the data is converted to speech via the text-to-speech converter 230 and is then routed through the output switch 400 to the output of the universal interface 200.

FIG. 4 is similar to FIG. 3, except that the input to the universal interface 200 handles touch-tone inputs rather than voice inputs. Therefore, the speech-to-command converter 220 of FIG. 4 is replaced with a tone-to-command converter 250 of FIG. 4. The tone-to-command converter 250 converts touch-tone inputs from a telephone of the user into commands. The commands are presented to the interface control module 300. The interface control module 300 then functions as described above.

FIG. 5 illustrates a universal interface with resource, facsimile, and pager managers. These managers are accessible from the web.

The universal interface 200 accepts touch-tone from the user's telephone. This tone is converted subsequently to commands through the tone-to-command converter 250. As in FIG. 4, the output of the tone-to-command converter 250 is then sent to the interface control module 300. The universal interface 200 functions in the same manner as the universal interface 200 of FIG. 4, except that the universal interface 200 of FIG. 5 can support resources, facsimiles and pagers through a resource manager 270, a facsimile manager 280, and a pager manager 290. These managers interface with an external telephone 275, a facsimile machine 285, and a pager 295, respectively.

The pager manager 290 can receive pages from another user, and can also page one or more external pagers 295. The pager manager 290 sends the information received from the pager 295 to the interface control module 300. The pager manager manages pager and message delivery queues. The UI 200 may use a native NT file system or CIFS virtual file system to manage system wide pager and dial-out queues. See, for example, copending U.S. application Ser. No. 09/169,360, entitled "Shared-Everything File Storage for Cluster System," filed Oct. 9, 1998, and commonly assigned, hereby incorporated by reference.

Similarly, the facsimile manager 280 receives facsimile messages from another user, and sends faxes to the facsimile 285. The fax manager manages the queues for facsimiles. It keeps track of the number of facsimile resources available in the system, maintains a list of outgoing faxes to be delivered, and incorporates a retry mechanism in case of an error.

The UI 200 has a fax-only mailbox so that callers can deposit directly a fax into their recipient's mailbox without first ringing the handset of the recipient. A caller can dial the fax-only mailbox number and press a start button on his or her fax machine. This feature is referred to as walk-away-fax.

The resource manager 270 assigns various conference resources in a multi-node system, where a multi-node system can consist of multiple UI's within a single UI, or can consist of a number of UI's connected in tandem. The resource manager 270 provides inter-node time slot management for conference calls.

As with the pager manager 280, the facsimile manager 280 and the resource manager 270 communicate data from the external facsimile machine 285 and telephone 275, respectively, to the interface control module 300. Information from all three managers, 270, 280 and 290, becomes available to the interface control module 300 for later access by the user. Although FIG. 6 illustrates an embodiment in which the user communicates via a touch-tone pad, resource managers, facsimile managers and pager managers can also be incorporated into a system in which a user communicates via speech.

To support the management of facsimiles, the universal interface 200 must contain facsimile drivers. The UI 200 provides fax capabilities by integrating facsimiles through the use of the CP12 board available from Dialogic. The board and drivers may be interfaced through a fax application manager.

FIG. 6 illustrates the universal interface with personal information manager PIM synchronization capabilities. The PIM 265 manages a user's address book, calendar, and to-do list.

The address book contains entries with fields such as name, title, company address, business phone, home address, home phone, mobile phone, facsimile number, e-mail address, web page address and notes.

The calendar keeps track of appointments. It has features such as subject/agenda, location, date/time, and appointment length.

The to-do list is used to keep track of tasks that need to be accomplished. Each to-do list entry has fields such as subject/agenda, priority, due date/time, and reminder notes. The UI can page, call, or send e-mail with to-do list contents.

In the embodiment of FIG. 6, the user communicates with the universal interface 200, and therefore with the information systems, via a touch-tone pad. This embodiment differs from the embodiment of FIG. 4, in that the information system is a computer 262, to which a PIM 265 can be connected.

In most PIM's, such as the "PalmPilot" or "Palm III," available from 3Com Corporation of Santa Clara, Calif., a synchronization process takes place from time to time with the personal computer 600. Using the "PalmPilot" as an example, this synchronization process is accomplished by placing the "PalmPilot" in a cradle, which is connected to the computer 252 through a serial cable; and pressing a "HotSync" button on the cradle. The synchronization process sends information from the "PalmPilot" device to the computer 262, thereby synchronizing databases on both units.

In one embodiment, the UI 200 synchronizes the PIM 265 with the universal interface 200 at the same time the user is synchronizing the PIM 265 with computer 262. In this embodiment, the UI 200 senses or intercepts the synchronization signal. When the UI 200 detects that the PIM 265 is requesting synchronization, the UI 200 communicates with the computer 262 and imports the synchronization information therefrom. In this way, a remote server connection is made any time there is a synchronization event, thereby making the most current synchronized database available via a wireless phone.

Alternatively, the universal interface 200 can periodically synchronize its database with the computer 262. In this embodiment, the universal interface 200 periodically communicates with computer 262 and requests information on the last PIM 265 synchronization. If the computer 262 indicates that it has synchronized with the PIM 265 since the last communication with the universal interface 200, the universal interface 200 sends control logic to the computer 262 to retrieve the most recent data.

The personal information synchronization can take place over the web. Further, the data sent via the Internet can be encrypted. Additionally, the data may be sent in compressed form or in incremental form when only new or updated data is transmitted.

FIG. 7 illustrates in block diagram form, the structure of the ICM 300. In the embodiment of FIG. 7, control code 310 receives as input commands from the speech-to-command converter 220 of FIG. 3 or the tone-to-command converter 250 of FIG. 4. The control code 310 detects the type of information system 110 to be accessed, and then accesses a model 1 through N 320, 330, which corresponds with the particular information system 110. Each of the model 1 through N 320, 330 provides a mapping of the input commands to commands recognized by the information system 110. The control code 310 looks up the chosen model, 320 or 330, the information system command that responds to the user input. The control code 310 then sends the command to the information system 110 and retrieves information therefrom.

FIGS. 8 and 9 illustrate in more detail the output switch 400 and the speech-to-text routing switch 500, respectively. The output switch 400 shown in FIG. 8 has three inputs. The first input receives speech from the speech-to-text routing switch 500 (FIGS. 4-5). This input represents speech data retrieved from the information system 110. The second input receives the speech output of the text-to-speech converter 230. This input is used by the output switch 400 if the data from the information system 110 is text which needs to be converted to speech by the text-to-speech converter 230. The third input to the output switch 400 is a switch control. If the interface control module 300 detects that the data coming from the information system 110 is text, it sends a switch control signal to switch 440, toggling switch 440 and allowing the text from the information system 110, after being converted by the text-to-speech converter 230, to flow to the output of the universal interface 200. Otherwise, if the interface control module 300 detects that the data from the information system 110 is speech, then the interface control module 300 sends a switch control signal to the switch 440 which sets the switch 440 in an untoggled state, thus routing the speech from the information system 110 through to the output of the universal interface 200.

When the speech first enters the output switch 400, it is received by a detector 410. The detector 410 detects whether the speech is analog or digital in form. If the speech is in an analog form, the detector 410 sends the speech to switch 430. It also asserts the switch control input to switch 430, throwing the switch to a position that allows the speech input into switch 430 to be sent to the switch 440. If, on the other hand, the speech received by the detector 410 is digital, the digital speech is sent to sound card 420. At the same time, the detector 410 sends a switch control input to the switch 430, routing the output from sound card 420 through to switch 440.

FIG. 9 illustrates the speech-to-text routing switch 500. This speech-to-text routing switch 500 receives data from the information system 110. This data can either be in text or speech format. If the data from the information system 110 is in speech format, the speech-to-text routing switch 500 routes the speech directly to the output switch 400. If, on the other hand, the data from the information system is in text format, the speech-to-text routing switch 500 is opened. In this instance, the text data is not routed to the output switch 400 through the speech-to-text routing switch 500.

The interface control module 300 controls the state of the switch 520 in the speech-to-text routing switch 500. In the event that the interface control module 300 detects that the data from the information system 110 is speech, it sends a control signal to the speech-to-text routing switch 500, throwing the switch 520 to a closed state. When the interface control module 300 detects text data from the information system 110, it sends the control signal to the speech-to-text routing switch 500, to maintain the switch 520 in an open position. When the data from information system 110 is text, the text from the information system 110 is received by the interface control module 300 and routed through the text-to-speech converter 230 to the output switch 400. This text, which has been converted to speech by the text-to-speech converter 230, is then sent to the output of the universal interface 200.

Turning now to FIG. 10, different methods in which a user can access various information systems 110 and 650, through various universal interfaces 200 and 620 are illustrated. In one embodiment, the user can access the information system 110 directly through a universal interface 200 through the use of a wireless telephone 105. In another embodiment, the universal interface 620 resides in a telephony server 610. In this embodiment, the universal interface 620 can access an information system 650. The universal interface 620 retrieves information from the information system 650 periodically. When the user communicates with the telephony server 610 through a wireless telephone 670, the user can retrieve previously retrieved information from the information system 650. This previously retrieved information is stored in memory 660. Alternatively, and in a third embodiment, the user can interface with the telephony server 610 to retrieve information in real-time. In this embodiment, the telephony server 610 acts as a conduit to allow connection between the wireless telephone 670 and the universal interface 200. From the user's standpoint, the operation is the same as if the user had accessed universal interface 200 directly.

As previously discussed, the universal interface 200 can operate in a nonreal-time mode. This mode is illustrated in FIGS. 11 and 12. The interface control module 300 communicates with one or more information systems 110 and

710. The interface control module 300 periodically retrieves data from these information systems. The interface control module 300 then stores the retrieved data in an internal or an external memory 660. If data retrieved from the information system 110 or 710 is in speech format, the interface control module 300 converts the speech to text before storing the data in memory 660. Once the data is stored in memory 660, the user can access previously stored data at any time. In the particular embodiment illustrated in FIG. 12, the user may access the universal interface using a touch-tone pad. In this case, the touch-tone input is converted to text via a tone-to-command converter 250 and is then input into the interface control module 300. The interface control module 300 interprets the commands from the user and retrieves the appropriate data from memory 660. Because the data in memory 660 is in text format, the interface control module 300 sends the data to a text-to-speech converter 230. This text-to-speech converter 230 converts the data into speech and provides the data in speech format to the user.

The embodiment of FIG. 11 operates similarly to that in FIG. 12 except that the UI 200 is designed to receive speech as input.

In one embodiment of the invention, the universal interface contains a language converter 720 (FIG. 12), which has the additional capability of translating electronic mail messages, and other data, which is stored in a different language, such as Spanish, French, among others. The language converter 720 first sends the first few lines of an e-mail or message to a module called the "language identifier." The language identifier analyzes the words used by looking them up in a list of often used and typical words for all languages under consideration. For example, words often used in the English language might include "the," "and," and "in." The converter tallies the results, and determines the appropriate language.

If the language used is different from that spoken by the user (whose language can be ascertained by the language identifier), then the language converter 720, before communicating the language to the user, converts the data to the user's language.

The universal interface may also monitor the language in which the data is stored. If the language converter 720 detects a change in the language, the universal interface 200 back-tracks a specified number of words and attempts to provide information in the language spoken by the user. This process of changing languages mid-stream can occur multiple times within one transmission.

In another embodiment, the universal interface accesses a spell converter 720 which spells out words that the user indicates are unintelligible. This embodiment compensates for pronunciation errors by the text-to-speech converters. These errors may occur because either the correct pronunciation falls into some grammatical exception or because the text being converted contains typographical errors.

In this embodiment, the universal interface receives a command such as a pound(#) touch-tone from the user telephone indicating that the user has received unintelligible words. The universal interface 200 halts the text-to-speech converter 230 and restarts communication at a retry point a specified number of words back from stopping point where the communication had ceased. When the universal interface 200 resumes communication, it accesses the spell converter 730 which tracks the text that was sent to the text-to-speech converter. The spell converter 730 provides, to the Universal Interface, the spelling for a predetermined number of words. The universal interface 200 then starts out by spelling a predetermined number of words from the restart point. The universal interface 200 then resumes communication at or near the same point where the user had indicated that the speech was unintelligible. Both the language converter 720 and the spell converter 730 may be modules internal to the interface control module 300.

As discussed above, depending upon the user's needs, the universal interface 200 can retrieve information from one or more information systems. These systems may include, for example, electronic mail, voice mail, websites, or personal information managers.

Regardless of the information system type, the universal interface 200 operates with one or more servers to provide the appropriate access. An e-mail server sends and receives messages using Internet Message Access Protocol (IMAP4) and Post Office Protocol/Simple Mail Transfer Protocol (POP3/SMTP) protocols, where SMTP is the Internet standard for transmitting and forwarding messages, POP is the Internet standard for retrieving e-mail, and IMAP is the "next generation" Internet standard for retrieving e-mail. The e-mail server also services Internet voice and fax messages.

In one embodiment, the e-mail server uses the same message store that is used for voice messages. Further, shared messages are not replicated.

IMAP stands for Internet Message Access Protocol. It is a method of accessing e-mail or bulletin board messages that are kept on a mail server. It permits a "client" e-mail program to access remote message stores as if they were local. E-mail stored on an IMAP4 server can be manipulated from a desktop computer at home, a workstation at the office, and a notebook computer while traveling, without the need to transfer messages or files back and forth between these computers. IMAP's ability to access messages (both new and saved) from more than one computer is important as reliance on electronic Messaging and use of multiple computers is a common mode of operation for the mobile user.

IMAP4 supports an offline access to the message store followed by a resynchronization of the message store with the server.

The IMAP4 protocol includes operations for creating, deleting, and renaming mailboxes; checking for new messages; permanently removing messages; setting and clearing flags; server-based RFC-822 and MIME parsing, and searching; and selective fetching of message attributes, texts, and portions thereof for efficiency. Note that MIME is an Internet standard for Messaging formatting. MIME allows for the attachment of various files to e-mail messages. These attachments might include text, voicemail, or faxes.

The e-mail directory server utilizes a X.500 directory that stores user addresses, provides routing information, and unifies e-mail components in the environment. The e-mail directory server uses the following protocols to provide a distributed directory service: LDAP (Lightweight Directory Access Protocol) for client access—allows for the publishing and access of directories such as phone directories, DAP (Directory Access Protocol) for message routing information, DSP (Directory System Protocol) for forwarding requests to remote directory servers and obtaining results, DISP (Directory Information Shadowing Protocol) for replicating information between servers, and HTTP (one of two standard foundations for the World Wide Web) for access from Web browsers. The Web/Directory gateway facilitates access to LDAP and X.500 Directory information from a standard web browser, and utilities to import and export data to other applications, including user registration from other mail systems.

Mailbox management must be reconciled between the voice and e-mail mailbox utilities. The E-mail X.500 mailbox structure and name service must be preserved, as they are integral to e-mail standards and protocols. In one embodiment, the voice mailbox tools are used as the primary mailbox management utilities. Voice mailbox creation would be exported to the X.500 e-mail box schema. Although there will be replication of the mailbox data between the voice and e-mail boxed structures, the message store is common between the voice and e-mail servers. Further, event notifications may be provided for messages received while the user is in a session.

Another server may service the world wide web. Using Active X and Java applets and script technology, one can access information over the Internet using a standard web browser. The information accessible over the web includes information associated with Internet web sites such as stock, weather, business information, as well as synchronized information from the user's PIM, such as calendar, address book and to-do list.

The web server uses COM interfaces to retrieve PIM information, e-mail, voice mail and fax messages. These operations may be performed locally on the web server.

In an embodiment which handles voice mail systems, the UI 200 provides an interface to various legacy voice mail systems such as systems from Octel or Centigram. The legacy system may forward voice and fax messages to the UI 200 using VPIM (Voice Profile for Internet Messaging). VPIM is based on MIME, an Internet standard for message formatting, which allows voice and fax mail systems to exchange messages over the Internet.

The UI may have fewer voice mail features than the legacy systems. In such a case, the UI maps strings and features that are supported and accesses data according to its perhaps limited abilities.

The UI provides the use of a voice or DTMF dial-out to the legacy system while preserving the virtual assistant functionality. The user can change parameters of the universal interface, and can also expand the UI capabilities, through either the telephone or the Web. Configuration changes over the web may be either menu or form driven. Changes over the phone may be menu driven.

It should be noted that although the input to the universal interface 200 has been illustrated as either tone or speech, the invention can accept as input either speech, tone, or both speech and tone. Further, while the invention has been shown and described with reference to an embodiment thereof, those skilled in the art will understand that the above and other changes in form and detail may be made without departing from the spirit and scope of the following claims.

What is claimed is:

1. A universal interface for accessing one or more information systems from a user device, the universal interface comprising:
   an input converter for converting voice or tone inputs from the user device to commands;
   an interface control module coupled to the input converter for receiving the commands from the input converter; determining one of the information systems to be accessed; converting the commands to commands recognizable by the information system; forwarding the converted commands to the information system; receiving data from the information system; and detecting the form of the data received from the information system, including whether the data received from the information system is speech or text data;
   a speech-to-text routing switch coupled to the interface control module for receiving data from the information system and control data from the interface control module;
   an output switch coupled to the interface control module and the speech-to-text routing switch for receiving speech from the speech-to-text routing switch, for receiving a control input from the interface control module, and for forwarding speech from the speech-to-text routing switch to the user device; and
   a text-to-speech converter coupled to the output switch for receiving text from the interface control module, converting the text to speech, and forwarding the speech to the output switch to deliver the speech to the user device.

2. The universal interface of claim 1, wherein the universal interface further comprises:
   means for detecting a first language in which the inputs from the user device are received;
   means for detecting a second language associated with the data received from the information system; and
   means for converting the data received from the information system into the first language.

3. The universal interface of claim 2, wherein the universal interface further comprises means for detecting more than one languages within a single fragment of data.

4. The universal interface of claim 1, further comprising a resource manager for establishing conference bridges to an external telephone having a telephone number, wherein:
   the interface control module detects, from the commands from the input converter, whether a conference bridge request has been made;
   the interface control module retrieves the telephone number of the external telephone to establish the conference bridge; and
   the interface control module forwards the telephone number to the resource manager; and the resource manager establishes a telephone connection with the external telephone.

5. The universal interface of claim 1, further comprising a facsimile manager for sending facsimiles to one or more facsimile machines, wherein:
   the interface control module detects, from the commands from the input converter, whether a facsimile request has been made;
   the interface control module retrieves a telephone number of a designated facsimile machine;
   the interface control module forwards the data and the telephone number to the facsimile manager; and
   the facsimile manager faxes the data to the designated facsimile machine.

6. The universal interface of claim 1, wherein the universal interface further comprises a pager manager for sending pager messages to one or more pagers, wherein:
   the interface control module detects, from the commands from the input converter, whether a pager request has been made;
   the interface control module retrieves data to be forwarded to the pager;
   the interface control module retrieves a telephone number of a designated pager to which the data is to be forwarded;
   the interface control module forwards the data and the telephone number to the pager manager; and
   the pager manager forwards the data to the designated pager.

7. The universal interface of claim 1, wherein the input converter comprises a voice input-to-command converter.

8. The universal interface of claim 1, wherein the input converter comprises a tone input-to-command converter.

9. The universal interface of claim 1, wherein the interface control module integrates the data from the information system periodically or manually under user control, the interface control module further comprising:
- means for retrieving data from the information systems;
- means for determining antecedent comparable relevance of the data;
- means for updating all of the data to reflect the most recent data;
- means for linking relevant data; and
- means for exporting the linked data to the information system.

10. The universal interface of claim 9, wherein the information systems comprise two or more of the following:
- a calendar;
- a to-do list;
- an address book;
- voice mail;
- e-mail; and
- a web site.

11. The universal interface of claim 1, wherein the interface control module integrates and synchronizes (i) a database of a personal information manager, (ii) a database residing on a personal digital assistant, and (iii) a database residing in the universal interface, the universal interface coupled to a computer on which the personal information database resides, wherein the computer further comprises:
- a first input terminal for receiving data from the personal digital assistant; a second input terminal for receiving data from the universal interface;
- a sensor for detecting a synchronization event triggered by a user requesting synchronization of the database of the personal digital assistant with the database of the personal information manager;
- an electronic mail system coupled to the Internet; and
- control logic coupled to receive the synchronized event from the sensor and to transmit data, over the electronic mail system, to the interface control module, wherein the control logic updates the data in each of the databases to reflect the most recent data entered into any database.

12. The universal interface of claim 11, wherein the synchronization information is sent to the universal interface in its entirety, in compressed form, or in incremental form.

13. The universal interface of claim 1, wherein the data sent from the information system to the universal interface is sent over the Internet.

14. The universal interface of claim 13, wherein the data sent is encrypted.

15. The universal interface of claim 1, wherein the user device is a mobile telephone.

16. The universal interface of claim 1, wherein the information system comprises at least one of: a dual tone multiple frequency (DTMF) driven voice mail system, a voice driven voice mail system, an electronic mail system, a web site, and a personal information manager.

17. The universal interface of claim 1, wherein the universal interface determines at least one of the following:
- whether the voice commands are being received from a user telephone;
- the information system to be accessed;
- whether the voice commands, after being converted to commands, are recognizable to the information system;
- whether the converted commands have been forwarded to the information system;
- whether data has been received from the information system;
- whether data from the information system is speech or text;
- the state of the speech-to-text routing switch; and
- the state of the output switch.

18. The universal interface of claim 1, wherein the interface control module further comprises:
- a translator coupled to the input converter for retrieving a model corresponding to the information system to be accessed and for converting the commands to commands recognizable by the information system.

* * * * *